US012803470B2

(12) United States Patent
Fu et al.

(10) Patent No.: US 12,803,470 B2
(45) Date of Patent: Nov. 17, 2026

(54) GENERATOR MODULE AND GENERATOR INCLUDING THE SAME

(71) Applicant: THE HONG KONG POLYTECHNIC UNIVERSITY, Hong Kong (CN)

(72) Inventors: Yiqiang Fu, Hong Kong (CN); Haihui Ruan, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 407 days.

(21) Appl. No.: 18/413,158

(22) Filed: Jan. 16, 2024

(65) Prior Publication Data

US 2025/0233530 A1 Jul. 17, 2025

(51) Int. Cl.
*H02N 1/08* (2006.01)

(52) U.S. Cl.
CPC .................................... *H02N 1/08* (2013.01)

(58) Field of Classification Search
CPC .. H02N 1/08; H02N 1/04; H02K 1/12; H02K 7/08
See application file for complete search history.

(56) References Cited

U.S. PATENT DOCUMENTS

| | | | |
|---|---|---|---|
| 9,484,842 B2 | 11/2016 | Wang et al. | |
| 2004/0007877 A1 | 1/2004 | Boland et al. | |
| 2009/0174281 A1 | 7/2009 | Lo et al. | |
| 2014/0246950 A1 | 9/2014 | Wang et al. | |
| 2014/0246951 A1* | 9/2014 | Wang ........................ | H02N 1/04 310/310 |
| 2017/0110988 A1 | 4/2017 | Izumi et al. | |
| 2023/0067006 A1* | 3/2023 | Chandra .............. | B60K 17/356 |

FOREIGN PATENT DOCUMENTS

| | | | |
|---|---|---|---|
| CN | 109450289 A * | 3/2019 | ............... H02N 1/08 |
| CN | 110323962 A * | 10/2019 | ............... H02N 1/08 |
| CN | 110504860 A * | 11/2019 | ............... H02N 1/08 |
| CN | 109921678 B | 4/2020 | |
| CN | 114465519 A | 5/2020 | |

(Continued)

OTHER PUBLICATIONS

English translation of CN-110323962-A (Year: 2019).*

(Continued)

*Primary Examiner* — Tulsidas C Patel
*Assistant Examiner* — Joshua Kiel M Rodriguez
(74) *Attorney, Agent, or Firm* — S&F/WEHRW

(57) ABSTRACT

A generator module comprises a stator, a rotator and a mechanical switch. The stator comprises a first group of patterned conductive coatings, a second group of patterned conductive coatings, a first group of dielectric sectors and a second group of dielectric sectors. The rotator comprises a third group of patterned conductive coatings and a third group of dielectric sectors. The first group of patterned conductive coatings electrically connects to a first electrical terminal. The second group of patterned conductive coatings electrically connects to a second electrical terminal. The third group of patterned conductive coatings electrically connects to a third electrical terminal. The mechanical switch allows the third electrical terminal to be selectively connectable to one of the first electrical terminal and the second electrical terminal.

19 Claims, 12 Drawing Sheets

(56) References Cited

FOREIGN PATENT DOCUMENTS

| | | | | | |
|---|---|---|---|---|---|
| CN | 111277168 | A | | 6/2020 | |
| CN | 110504860 | B | | 2/2021 | |
| CN | 113241966 | B | | 5/2022 | |
| CN | 116155132 | A | | 5/2023 | |
| JP | 6609015 | B2 | | 11/2019 | |
| KR | 101817601 | B1 | * | 2/2018 | ........... H02K 11/215 |

OTHER PUBLICATIONS

English translation of CN-109450289-A (Year: 2019).*
English translation of CN-110504860-A (Year: 2019).*
English translation of KR-101817601-B1 (Year: 2018).*
Fu Y, Ruan H. Experimental and theoretical investigations of a novel electret-based wave energy converter. Nano Energy. Dec. 1, 2022;103:107854.
Wu H, Wang S, Wang Z, Zi Y. Achieving ultrahigh instantaneous power density of 10 MW/m2 by leveraging the opposite-charge-enhanced transistor-like triboelectric nanogenerator (OCT-TENG). Nature Communications. Sep. 15, 2021;12(1):5470.
Tada YT. Experimental characteristics of electret generator, using polymer film electrets. Japanese journal of applied physics. Mar. 1, 1992;31(3R):846.
Du X, Du L, Li P, Liu X, Han Y, Yu H, Tao K, Tang L. A dielectric elastomer and electret hybrid ocean wave power generator with oscillating water column. Nano Energy. Jun. 15, 2023;111:108417.
Bi M, Wang S, Wang X, Ye X. Freestanding-electret rotary generator at an average conversion efficiency of 56%: theoretical and experimental studies. Nano Energy. Nov. 1, 2017;41:434-42.
Miyoshi T, Adachi M, Suzuki K, Liu Y, Suzuki Y. Low-profile rotational electret generator using print circuit board for energy harvesting from arm swing. In2018 IEEE Micro Electro Mechanical Systems (MEMS) Jan. 21, 2018 (pp. 230-232). IEEE.

* cited by examiner

GENERATOR MODULE AND GENERATOR INCLUDING THE SAME

FIELD OF THE DISCLOSURE

The present disclosure generally relates to power generation, and more particularly to generator apparatus for generating electricity.

BACKGROUND

A generator may convert motion-based power into electric power. Electret-based and triboelectric generators are two typical generators. They use dielectrics as the functional materials for electrostatic induction and/or triboelectrification, and as such, they may be called dielectric-based generators (DBGs). These generators have the advantages of simple structure, lightweight, low cost, and facile fabrication. Besides, they are able to be configured in various ways. For example, the rotary mode is one of the most common and promising ones. However, innovations are still required for applications of generators in various areas where conventional permanent-magnet electromagnetic generators encounter difficulties.

It is an object of the present disclosure to overcome or substantially ameliorate one or more of the disadvantages of prior art, or at least to provide a useful alternative.

SUMMARY

In one aspect of the disclosure there is provided a generator module. The generator module comprises a stator, a rotator rotatable with respect to the stator, and a mechanical switch. The stator comprises a stator substrate having a first stator side, a first group of patterned coatings that is electrically conductive and disposed on the first stator side, and a second group of patterned coatings that is electrically conductive and disposed on the first stator side. The first group of patterned coatings is electrically isolated from the second group of patterned coatings. The stator further comprises a first group of dielectric sectors that is negatively charged and disposed on the first group of patterned coatings, and a second group of dielectric sectors that is positively charged and disposed on the second group of patterned coatings. Each positively charged dielectric sector is adjacent to two negatively charged dielectric sectors along a circumferential direction. Each negatively charged dielectric sector is adjacent to two positively charged dielectric sectors along the circumferential direction. The rotator comprises a rotator substrate having a first rotator side, a third group of patterned coatings that is electrically conductive and disposed on the first rotator side, and a third group of dielectric sectors that is either negatively or positively charged and disposed on the third group of patterned coatings. The first stator side of the stator substrate faces the first rotator side of the rotator substrate. The first group of patterned coatings electrically connect to a first electrical terminal. The second group of patterned coatings electrically connect to a second electrical terminal. The third group of patterned coatings electrically connect to a third electrical terminal. The mechanical switch is configured to allow the third electrical terminal to be selectively connectable to one of the first electrical terminal and the second electrical terminal.

In another aspect of the disclosure there is provided a generator for generating electricity. The generator comprises a housing and a plurality of generator modules. The generator modules are disposed within the housing and share a shaft, thereby forming a chain of generator modules along a longitudinal axis of the shaft. Each generator module comprises a stator and a rotator that are mounted onto the shaft. The stator comprises a stator substrate having a first stator side, a first group of patterned coatings that is electrically conductive and disposed on the first stator side, and a second group of patterned coatings that is electrically conductive and disposed on the first stator side. The first group of patterned coatings is electrically isolated from the second group of patterned coatings. The stator further comprises a first group of dielectric sectors that is negatively charged and disposed on the first group of patterned coatings, and a second group of dielectric sectors that is positively charged and disposed on the second group of patterned coatings. Each positively charged dielectric sector is adjacent to two negatively charged dielectric sectors along a circumferential direction. Each negatively charged dielectric sector is adjacent to two positively charged dielectric sectors along the circumferential direction. The rotator comprises a rotator substrate having a first rotator side, a third group of patterned coatings that is electrically conductive and disposed on the first rotator side, and a third group of dielectric sectors that is negatively or positively charged and disposed on the third group of patterned coatings. The first stator side of the stator substrate faces the first rotator side of the rotator substrate. The first group of patterned coatings is electrically connected to a first electrical terminal. The second group of patterned coatings is electrically connected to a second electrical terminal. The third group of patterned coatings is electrically connected to a third electrical terminal. The generator further comprises a first common terminal, a second common terminal and a third common terminal. The first electrical terminal of each generator module is connected to the first common terminal. The second electrical terminal of each generator module is connected to the second common terminal and the third electrical terminal of each generator module is connected to the third common terminal, such that the plurality of generator modules are electrically connected in parallel.

Other example embodiments are discussed herein.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The drawings are not to scale, unless otherwise disclosed. Certain parts of the drawings are exaggerated for explanation purposes and shall not be considered limiting unless otherwise specified.

DETAILED DESCRIPTION

Figure 1:
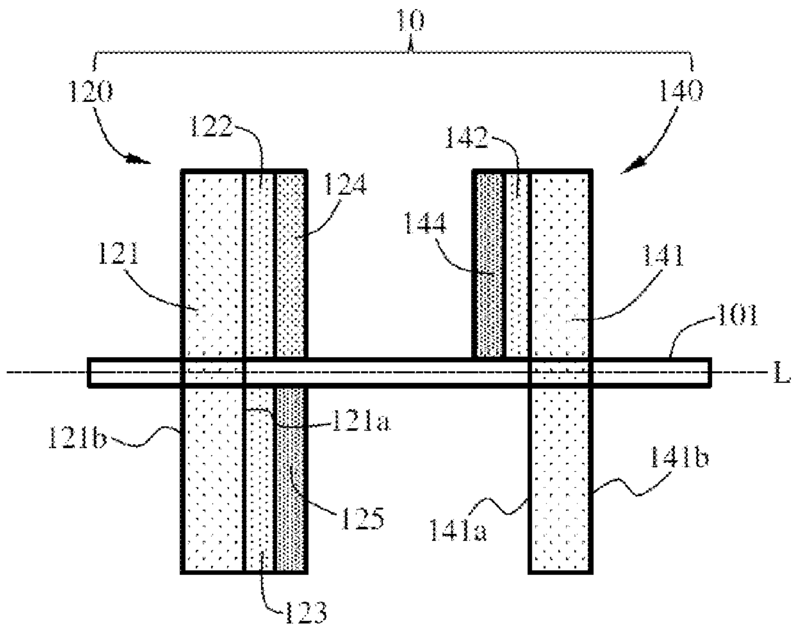
FIG. 1 illustrates a generator module according to certain embodiments of the present disclosure.

The present disclosure will now be described with reference to the following examples which should be considered in all respects as illustrative and non-restrictive.

Unless the context clearly requires otherwise, throughout the description and the claims, the words "comprise", "comprising, and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", etc., to describe a common object, merely indicate that different instances of like objects are being referred to, and are not intended to imply that the objects so described must be in a given sequence, either temporally, spatially, in ranking, or in any other manner.

Example embodiments relate to a generator or a part of the generator, such as a generator module, with improved performance.

The present inventors have recognized that many existing systems have technical disadvantages in one aspect or another. For example, power capacity is considered as one of the most essential characteristics for a generator. An existing rotary dielectric-based generators (DBG) typically comprises a rotator and a stator, both of which are in the form of circular plates in structure. Thus, to enhance the power capacity, one straightforward method is to enlarge the diameters of the circular plates. However, such simple scaling up may bring in more cons than pros. On one hand, larger diameters result in larger volumes and make the assembly more difficult. For example, it can be more challenging to maintain good parallelism between rotators and stators as their size increases. On the other hand, most dielectric-based generators function as high-voltage sources. This poses potential issues when one intends to directly use their output. Tailored power management circuits are generally employed to modify the output. In this regard, the much higher voltage output resulting from diameter scaling-up will only make it worse. Therefore, it is challenging to improve the power capacity of the dielectric-based generators and in the meanwhile circumvent the abovementioned unfavourable effects.

The dielectric-based generators have two typical types, namely triboelectric and electret-based generators. Triboelectric generators work through a combination of triboelectrification and electrostatic induction between their stator and rotator that are in contact, while electret-based generators only rely on the electrostatic induction between their stator and rotator that are separated with a gap. In either case, sufficient parallelism between the stator and the rotator should be maintained, especially at high rotation speed. In existing systems, flanges may be used for maintaining certain distance between a stator and a rotator. In doing so, high-precision machining and assembly are needed. In addition, it easily gets bulky when multiple rotators and stators are mounted on a same shaft as more flanges and related components are required. Further issues that electret-based and triboelectric generators commonly share are high output impedance and low charge transfer, which results in low power output.

Example embodiments solve one or more of the problems associated with the existing systems and provide technical solutions with new designs and improved performance.

According to one or more embodiments, there is provided with a generator module comprising a stator and a rotator rotatable with respect to the stator for generating electricity. A mechanical switch is provided to release the induced charge efficiently during rotation of the rotator. In some embodiments, the mechanical switch comprises a flexible, conductive brush attached to the rotator and a plurality of teeth provided on the two groups of patterned coatings on the stator. This design ensures both operational robustness and manufacturing simplicity.

According to one or more embodiments, a thrust bearing-like design is adopted for a generator module or a generator comprising one or more generator modules. A thrust bearing structure may be arranged on the stator. For example, a plurality of concave holes can be formed on the stator such that each hole receives a bearing ball. The concave holes may be formed along the inner and outer circumferences of the stator for receiving bearing balls. Alternatively, the thrust bearing structure may be arranged on the rotator in a similar manner as it is formed on the stator or a different manner as long as it can fulfill the desired functions. The thrust bearing-like design allows rotators and stators to be installed onto a shaft with tiny separation gaps and good parallelism, which is particularly advantageous to an electret-based generator. In some embodiments, the bearing balls may be lubricated ceramic balls for ensuring that the generator maintains smooth rotation with reduced contact friction, even at high rotation speeds.

According to one or more embodiments, there is provided with a generator comprising a plurality of generator modules having a mechanically-serial and electrically-parallel configuration. First, this configuration enables the generator modules to be mechanically serially assembled or added on a single shaft with compact structure and the number of modules installed can be easily extendable. As such, the power capacity can be flexibly adjusted according to practical needs. Second, this configuration allows the electrical outputs of the generator modules to be superimposed to achieve increased current output. As the generator modules are electrically connected in parallel, the voltage output is maintained the same across the terminals of the generator modules. Compared to high voltage output in many existing systems, the present configuration is favourable in terms of power management and transmission in many practical applications. This design also enables modularized design and extendable power capacity.

One or more embodiments comprises a generator that is rotary, modularized, and capacity-extendable. These technical advantages make the generator more practical, applicable, and competent compared to the existing generators that work through electrostatic induction and/or triboelectrification.

One or more embodiments comprise a generator module or a generator that is mainly made of plastics so that it has the potential to be more cost-effective and more adaptable to the applications in corrosive environments (e.g., in ocean) than many existing generators that are based on permanent magnet and metallic coils. In some embodiments, for example, the main materials used for manufacturing the generator, such as the electret or triboelectric films, the substrates of rotators and stators, and the housing comprising a shell and covers, are all plastics, which is much cheaper than the rare-earth magnets commonly used in conventional permanent magnet generators. Further, the plastics make the generators according to one or more embodiments lighter, portable and easy to carry around or mounted in certain application circumstances where a generator with less weight is of particular advantage and desirability.

With reference to FIG. 1, a generator module 10 comprises a stator 120 and a rotator 140. The stator 120 and rotator 140 may be mounted on a shaft 101 with a longitudinal axis L, such that in operation, the rotator 140 rotates around the longitudinal axis L and with respect to the stator 120.

The stator 120 comprises a stator substrate 121. The stator substrate 121 has a first stator side 121*a* and a second stator side 121*b* opposite the first stator side 121*a*. A first group of patterned coatings 122 is electrically conductive and disposed on the first stator side 121*a*. A second group of patterned coatings 123 is electrically conductive and disposed on the first stator side 121*a*. The first group of patterned coatings 122 is electrically isolated from the second group of patterned coatings 123, which may be realised, for example, through a patterning process during fabrication. The first and second groups of patterned coatings may be metallic coatings, which, for example, may comprise one or more of copper, iron, or aluminium, or the like. In some embodiments, copper is used for the metallic coatings due to its excellent conductivity and physical performance. In some other embodiments, non-metallic materials, such as doped semiconductors, may be used as patterned coatings. In some other embodiments, the patterned coatings may comprise one or more conductive polymer materials. In some embodiments, each patterned coating in the first or second group of the patterned coatings may be called a patterned coating sector or a coating sector.

A first group of dielectric sectors 124 is negatively charged and disposed on the first group of patterned coatings 122. A second group of dielectric sectors 125 is positively charged and disposed on the second group of patterned coatings 123. Each positively charged dielectric sector is adjacent to two negatively charged dielectric sectors along a circumferential direction. Each negatively charged dielectric sector is adjacent to two positively charged dielectric sectors along the circumferential direction. The first and second groups of dielectric sectors comprise proper dielectric materials. For example, each dielectric sector may comprise an electret film or a triboelectric film.

The rotator 140 comprises a rotator substrate 141. The rotator substrate 141 has a first rotator side 141*a* and a second rotator side 141*b* opposite the first rotator side 141*a*. The first rotator side 141*a* faces the first stator side 121*a* of the stator substrate 121.

A third group of patterned coatings 142 is electrically conductive and disposed on the first rotator side 141*a*. A third group of dielectric sectors 144 is negatively or positively charged and disposed on the third group of patterned coatings 142. The third group of patterned coatings may be metallic coatings, such as copper coatings, iron coatings, aluminium coatings, etc. Similarly, the third group of patterned coatings may comprise non-metallic materials, such as one or more conductive polymer materials, as long as these materials have satisfactory conductive performance. The third group of dielectric sectors comprises dielectric materials. For example, each dielectric sector may comprise an electret film or a triboelectric film. In some embodiments, each patterned coating in the third group of the patterned coatings may be called a patterned coating sector or a coating sector.

The first group of patterned coatings 122 may comprise a plurality of patterned coatings. For example, the number of the patterned coatings in this group may be 3, 4, 5 or more. The first group of dielectric sectors 124 may comprise a plurality of dielectric sectors. For example, the number of the dielectric sectors in this group may be 3, 4, 5 or more. The number of the coatings in the first group of patterned coatings 122 is equal to the number of the dielectric sectors in the first group of dielectric sectors 124, such that each dielectric sector is disposed onto a respective patterned coating. This number is represented as $n_1$.

The second group of patterned coatings 123 may comprise a plurality of pattern coatings. For example, the number of the patterned coatings in this group may be 3, 4, 5 or more. The second group of dielectric sectors 125 may comprise a plurality of dielectric sectors. For example, the number of the dielectric sectors in this group may be 3, 4, 5 or more. The number of the coatings in the second group of patterned coatings 123 is equal to the number of dielectric sectors in the second group of dielectric sectors 125, such that each dielectric sector is disposed onto a respective patterned coating. This number is represented as $n_2$. Further, $n_1=n_2$.

The third group of patterned coatings 142 may comprise a plurality of pattern coatings. For example, the number of the patterned coatings in this group may be 3, 4, 5 or more. The third group of dielectric sectors 144 may comprise a plurality of dielectric sectors. For example, the number of the dielectric sectors in this group may be 3, 4, 5 or more. The number of the coatings in the third group of patterned coatings 142 is equal to the number of dielectric sectors in the third group of dielectric sectors 142, such that each dielectric sector is disposed onto a respective patterned coating. This number is represented as $n_3$. In some embodiments, optionally and advantageously, $n_3=n_1$.

The first group of dielectric sectors 124 is associated with the first group of patterned coatings 122 that may electrically connect to a first electrical terminal. The second group of dielectric sectors 125 is associated with the second group of patterned coatings 123 that may electrically connect to a second electrical terminal, The third group of dielectric sectors 144 is associated with the third group of patterned coatings 142 that may electrically connect to a third electrical terminal. These electrical connections may be realised through metal wires, such as copper pin terminals or wires, and printed circuit board (PCB) technology. The first, second, and third electrical terminals are not shown in FIG. 1 but will be illustrated and described in one or more embodiments below with reference to one or more figures.

In some embodiments, optionally and advantageously, a mechanical switch may be provided to allow the third electrical terminal to be selectively connectable to one of the first electrical terminal and the second electrical terminal so as to avoid or mitigate accumulation of induced charges during rotation of the rotator in operation. As one example, the mechanical switch may comprise a flexible, conductive brush attached to the rotator and a plurality of teeth formed on the stator. During rotation of the rotator, the brush will successively contact the teeth, thereby connecting or disconnecting the connection of the third electrical terminal with the first or second electrical terminal.

FIGS. 2A, 2B, 2C, 2D, 2E and 2F illustrate a generator module and its stator 220 and rotator 240 according to certain embodiments. The stator 220 comprises a stator substrate 221 coated with patterned coatings that are electrically conductive. Onto the patterned coatings are provided with a first group of dielectric sectors consisting of three dielectric sectors 224 and a second group of dielectric sectors consisting of three dielectric sectors 225. The dielectric sectors 224 are negatively charged (indicated by the symbols "−") while the dielectric sectors 225 are positively charged (indicated by the symbols "+"). The dielectric sectors 224, 225 are alternatively arranged along a circumferential direction of the circular shaped stator. The dielectric sectors 224 are coupled to a first electrical terminal 227*a* via corresponding patterned coatings. The dielectric sectors 225 are coupled to a second electrical terminal 227*b* via corresponding patterned coatings.

The materials of the dielectric sectors 224, 225 may be properly selected. In some embodiments, the dielectric sectors 224, 225 comprise polytetrafluoroethylene (PTFE) films that are properly charged or polarized. In some other embodiments, the dielectric sectors 224 comprise fluorinated ethylene propylene (FEP) films or any other proper triboelectric material(s), and the dielectric sectors 225 comprise polycarbonate (PC) films or any other positive-polarity triboelectric material(s). In some embodiments, other polymers with good or superior charge retention capability may be used for the dielectric sectors 224, 225. Advantageously, the thicknesses of the dielectric sectors 224, 225 are the same.

Figure 2A:
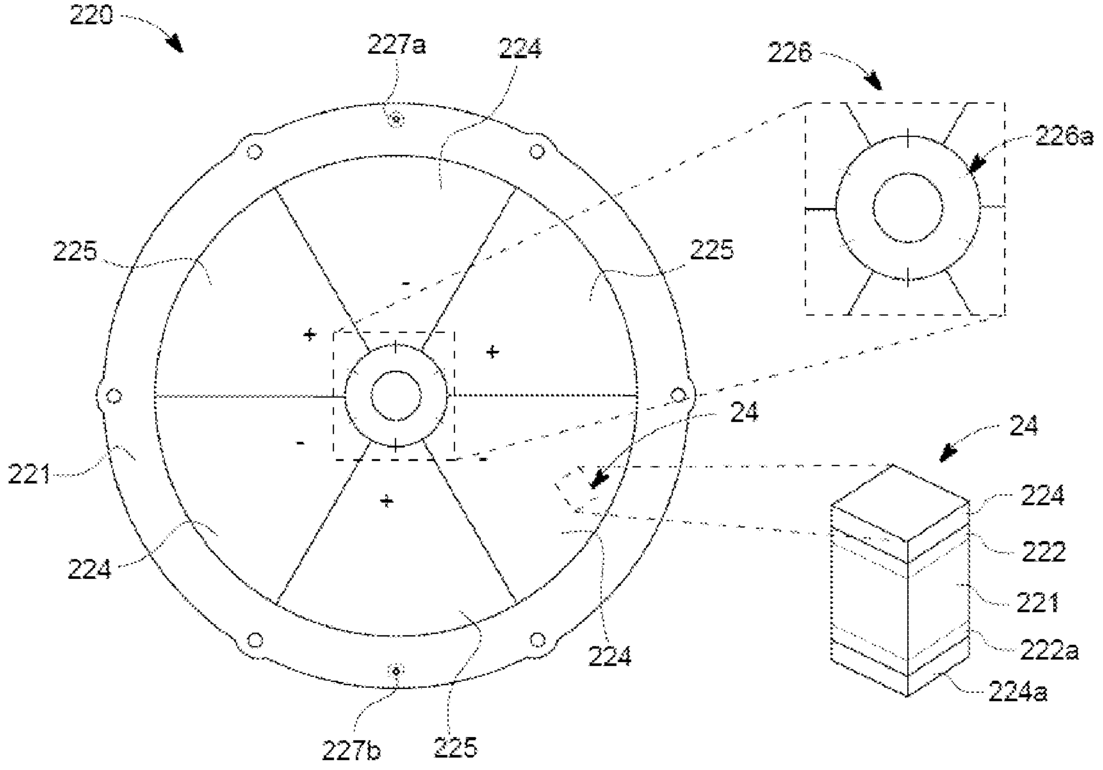
FIG. 2A illustrates a stator of a generator module according to certain embodiments of the present disclosure.

FIG. 2A also shows an enlarged view of the central zone 226 of the stator 220. As illustrated, each patterned coating corresponding to a respective dielectric sector is provided with a tooth 226*a* formed at its inner circumference near the central zone 226, thereby forming a plurality of teeth. Each tooth may be a part of the related patterned coating. Alternatively, each tooth may be separately formed and electrically connected to the related patterned coating. Six teeth are shown in the present embodiment for illustrative purpose. As will be described later below, the teeth form part of a mechanical switch.

Figure 2B:
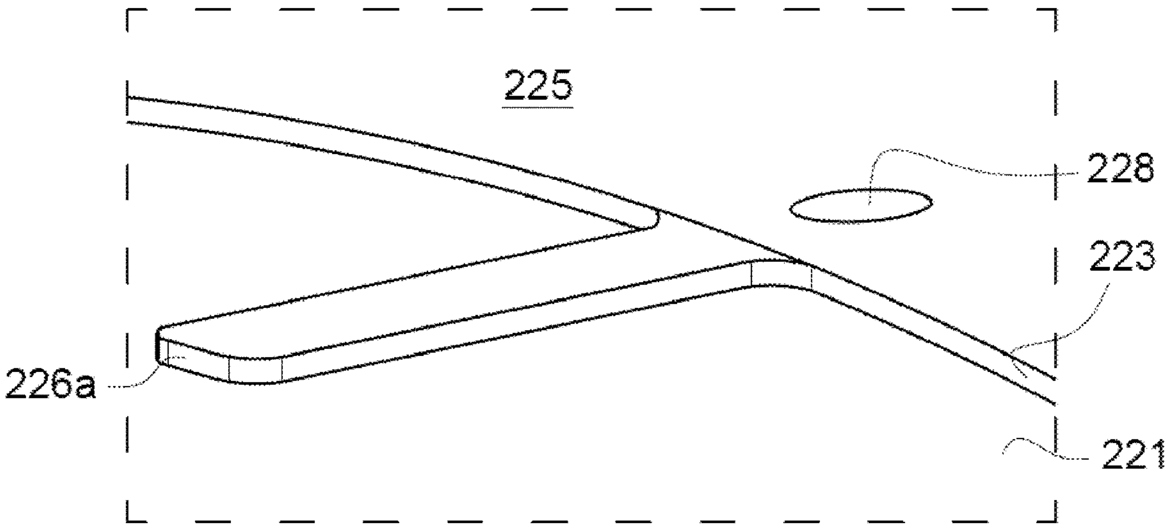
FIG. 2B illustrates a tooth provided on a stator of the generator module of FIG. 2A.

An enlarged view of the tooth 226*a* is shown in FIG. 2B. The tooth 226*a* is illustrated as an elongate extension from the patterned coating 223 that supports the dielectric sector 225. A blind via 228 is shown for establishing electrical connection between the coating sector and the corresponding inner layer, and as a result, electrically joining the coating sectors of the same group together.

Referring again to FIG. 2A, it illustrates a cross-sectional view of a region 24 of the dielectric sector 224 when cutting along a direction perpendicular to the direction from the dielectric sector 224 toward the stator substrate 221. The cross-sectional view shows the stator substrate 221 is double-sided, which is optional rather than essential. That is, on one side, the patterned coating 222 is disposed onto the stator substrate 221 and the dielectric sector 224 is disposed onto the patterned coating 222. On the other side, the patterned coatings 222*a* is disposed onto the stator substrate 221 and the dielectric sector 224*a* is disposed onto the patterned coatings 222*a*. Advantageously, the patterned coating 222 and patterned coatings 222*a* are symmetrically arranged with respect to the stator substrate 221, and the dielectric sector 224 and dielectric sector 224*a* are symmetrically arranged with respect to the stator substrate 221. A top view of the fabricated stator is shown in FIG. 2E.

Figure 2C:
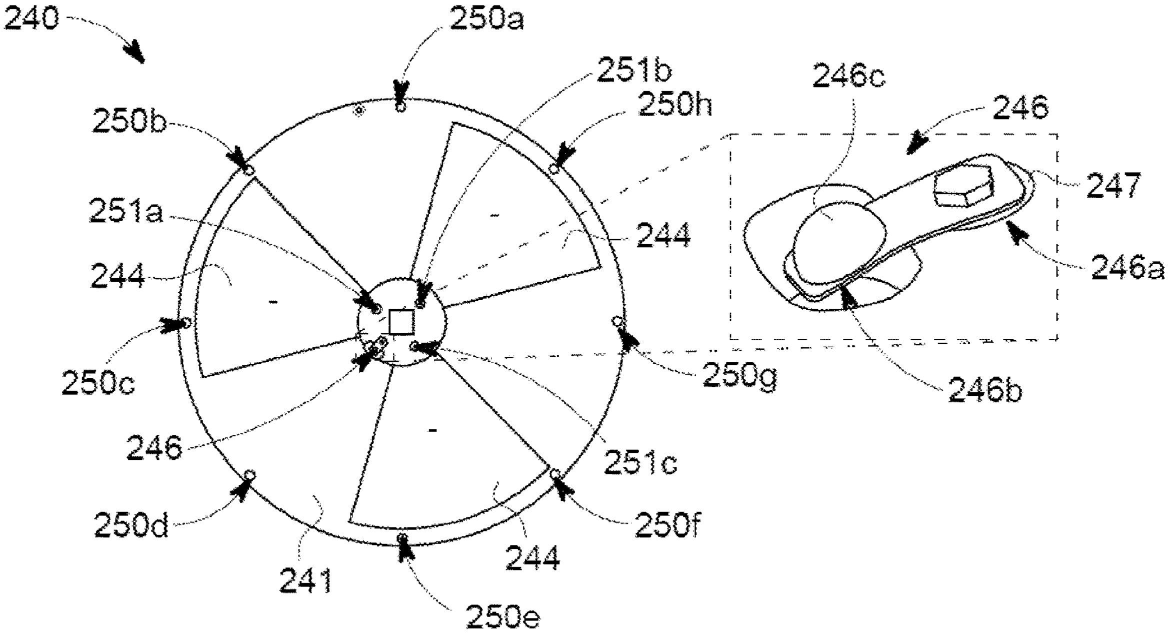
FIG. 2C illustrates a rotator of a generator module according to certain embodiments of the present disclosure.

Referring to FIG. 2C, the rotator 240 comprises a rotator substrate 241 coated with patterned coatings that are electrically conductive. Onto the patterned coatings are provided with a third group of dielectric sectors consisting of three dielectric sectors 244 that are negatively charged (indicated by the symbols "−"). This is for illustrative purpose only. It will be understood that in some embodiments, the dielectric sectors 244 may be positively charged. The dielectric sectors 244 are coupled to a third electrical terminal 247 via the patterned coatings underneath.

The materials of the dielectric sectors 244 may be properly selected. In some embodiments, the dielectric sectors 244 comprise polytetrafluoroethylene (PTFE) films that are negatively charged or polarized. In some other embodiments, the dielectric sectors 224 comprise fluorinated ethylene propylene (FEP) films or any other proper triboelectric material that has opposite tribo-polarity to that of dielectric sectors 225. Advantageously, the thickness of the dielectric sectors 244 is smaller than the thickness of the dielectric sectors 224, 225. For example, the dielectric sectors 244 may have a thickness of around 10 μm and the dielectric sectors 224, 225 may have a thickness of around 100 μm.

Further, a brush 246 is provided near the central region of the rotator 240. The brush 246 and the plurality of teeth of the stator 220 constitute a mechanical switch that facilitates the release of induced charge and enhances the output of the generator module. The brush 246 may be a flexible conductive brush. This is advantageous. First, it ensures desirable selective contact with the teeth in operation. Second, it is robust and not easy to be damaged or unfavourably impede rotation of the rotator because of introduction of unwanted friction. By way of example, the brush 246 comprises a first end 246*a* and a second end 246*b*. The first end 246*a* may be mounted onto the third electrical terminal 247, such as through a M0.6 screw. In some embodiments, soldering or conductive glue may be used for mounting the first end 246*a*. The second end 246*b* has a brush head 246*c* electrically contactable to each of the plurality of teeth in operation.

Figure 2D:
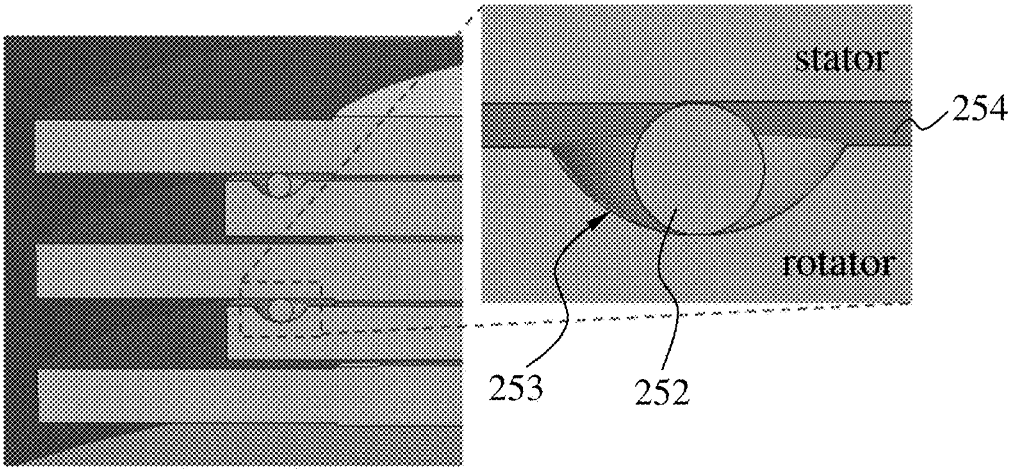
FIG. 2D illustrates a thrust bearing structure according to certain embodiments of the present disclosure.
Figure 2E:
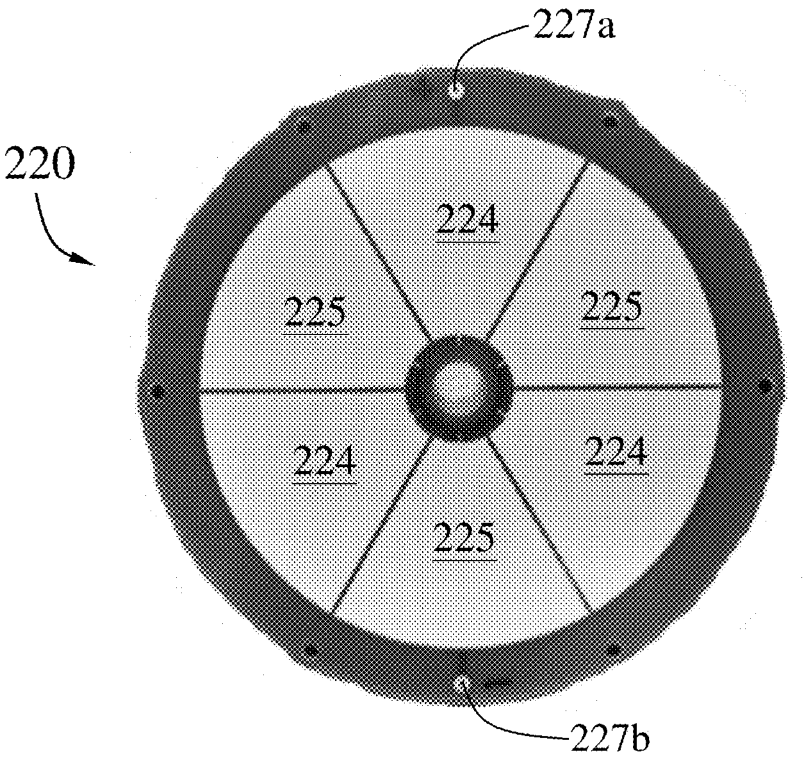
FIG. 2E shows a fabricated stator of a generator module according to certain embodiments of the present disclosure.
Figure 2F:
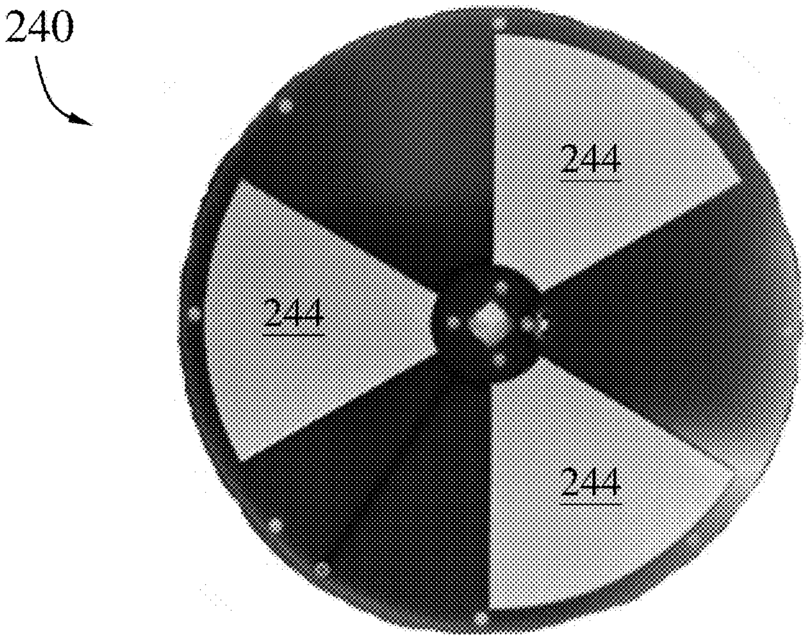
FIG. 2F shows a fabricated rotator of a generator module according to certain embodiments of the present disclosure.

Further, referring to FIGS. 2C and 2D, a thrust bearing structure is provided on the rotator 240. This is for illustrative purpose only. In some embodiments, the thrust bearing structure may be provided on the stator. The thrust bearing structure comprises a plurality of concave holes formed on the rotator 240 and a plurality of bearing balls with each bearing ball 252 being received in a respective concave hole 253. A part of the bearing ball 252 protrudes out of the concave hole 253 so as to ensure there is always a minimum gap 254 between the rotator and stator when the generator module is in operation. In the present embodiment, eight bearing balls 250*a*, 250*b*, 250*c*, 250*d*, 250*e*, 250*f*, 250*g* and 250*h* are formed along the outer circumference of the rotator 240 and three bearing balls 251*a*, 251*b* and 251*c* are formed along the inner circumference of the rotator 240. The thrust bearing structure facilities steady operation at relatively high rotation speeds and control the separation gap between the stator 220 and the rotator 240. The thrust bearing structure further facilitates improved parallelism between rotators and stators. The bearing balls may be lubricated ceramic balls for ensuring that the generator maintains smooth rotation with reduced contact friction, even at high rotation speeds. A top view of the fabricated rotator is shown in FIG. 2F.

Figure 3A:
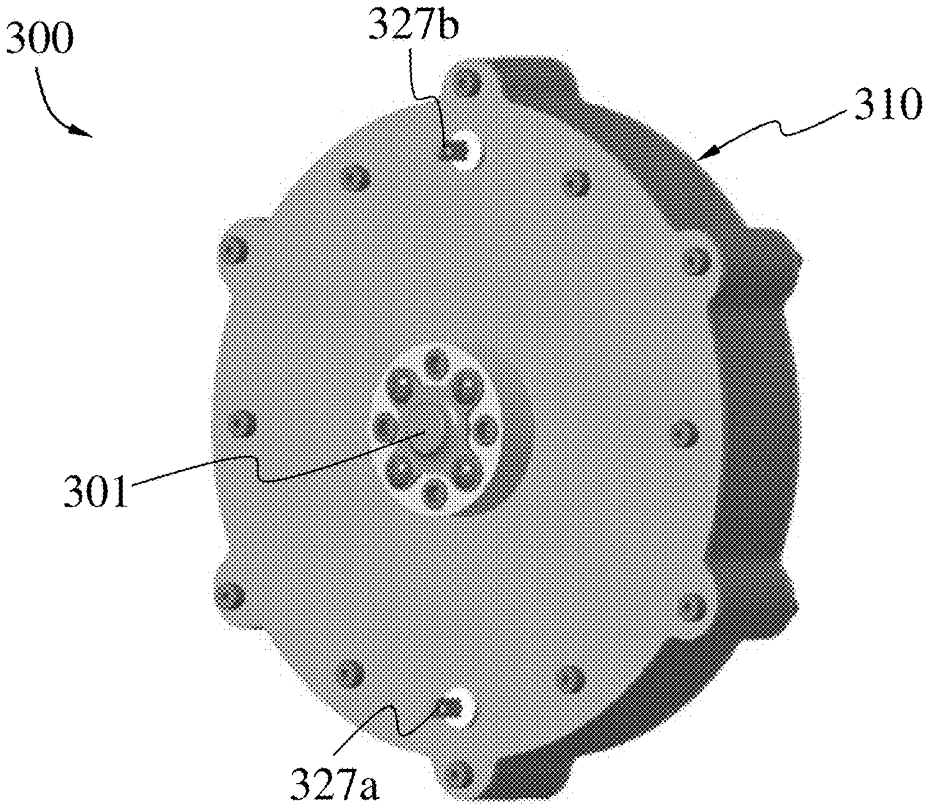
FIG. 3A illustrates a generator according to certain embodiments of the present disclosure.
Figure 3B:
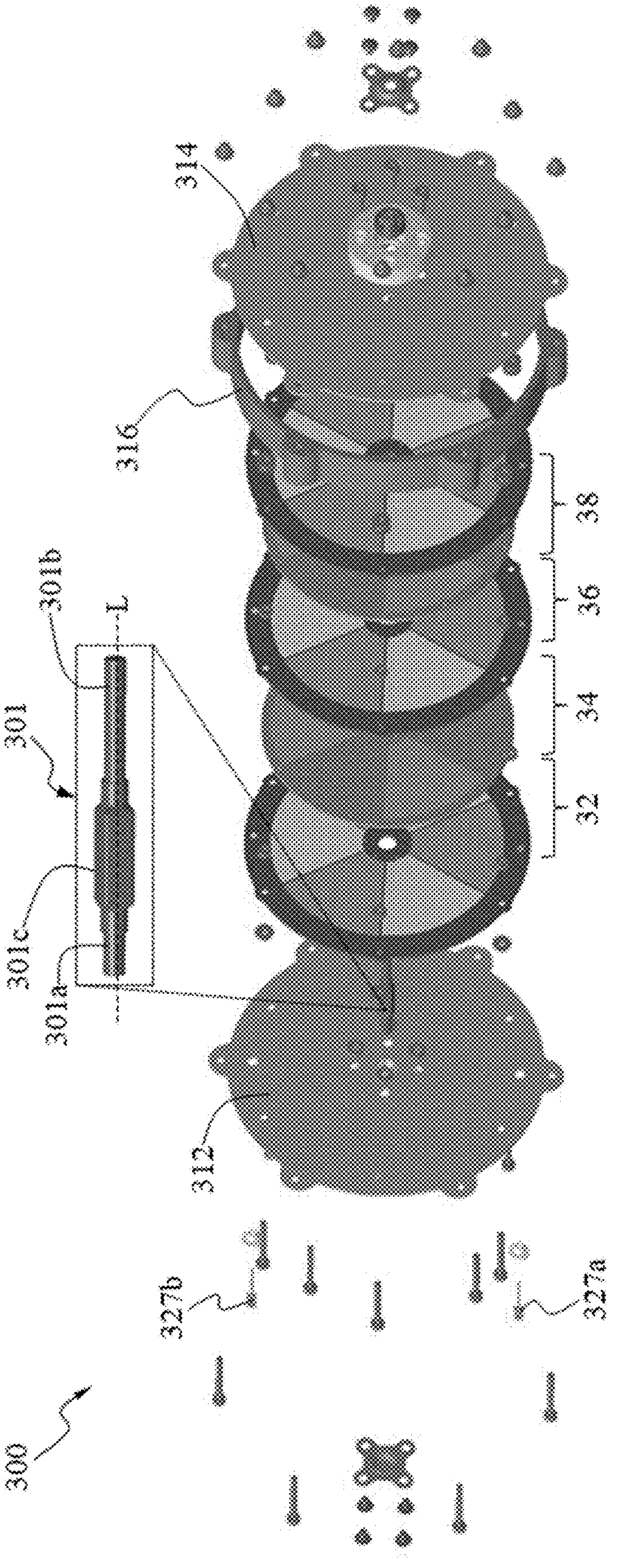
FIG. 3B illustrates an exploded view of the generator of FIG. 3A.

Referring to FIGS. 3A and 3B, a generator 300 comprises a housing 310, a shaft 301, and a plurality of generator modules. The plurality of generator modules are disposed within the housing 310 and shares the shaft 301, thereby forming a chain of generator modules along a longitudinal axis L of the shaft 301.

Each of the generator modules can be the generator module as described above according to one or more embodiments. In the present embodiment, four generator modules 32, 34, 36 and 38 are provided. The four generator modules comprise three stators and two rotators. The stators can be spaced using washers and nuts. The stators and rotators are double-sided. As such, every two facing sides of a stator and an adjacent rotator form a generator module. Let $N_s$, $N_r$, and $N_g$ be the numbers of the stators, rotators, and generator modules, respectively. Then, there will be $N_g=(N_s+N_r)-1$.

Figure 3C:
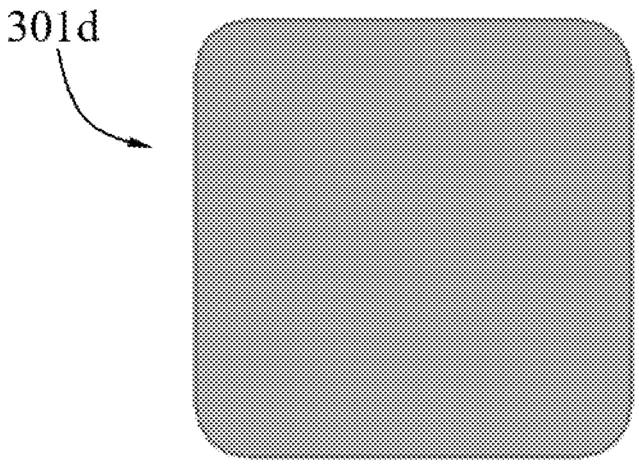
FIG. 3C illustrates a cross-sectional view of the middle segment of the shaft of FIG. 3B.
Figure 3D:
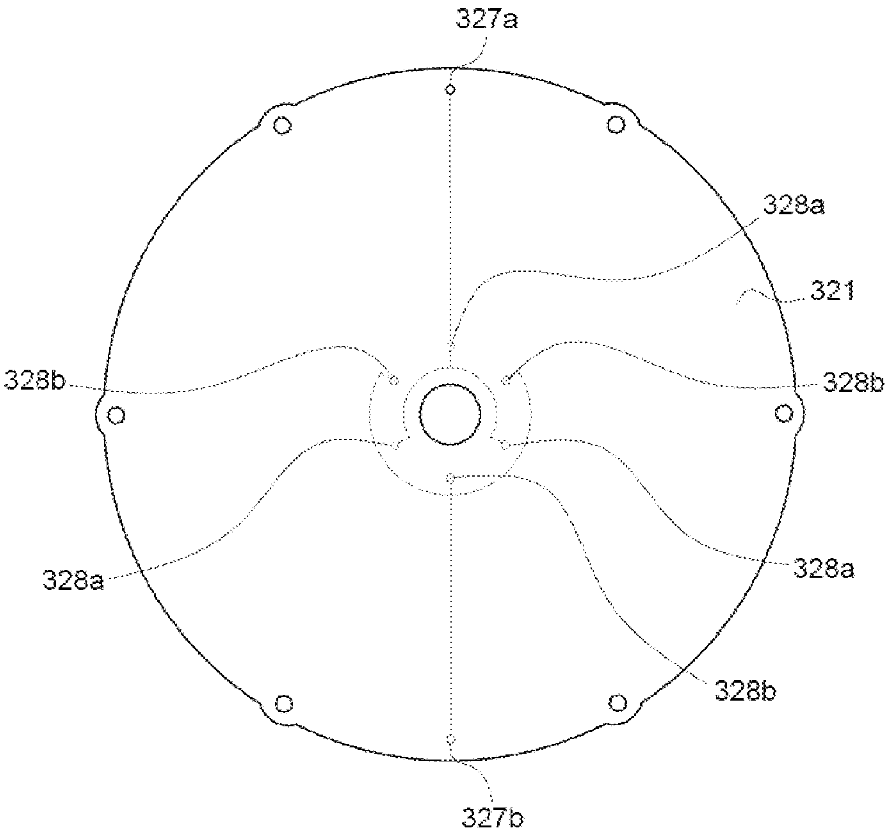
FIG. 3D illustrates an inner layer of the stator substrate of the generator of FIG. 3A.

The shaft 301 comprises a first segment 301*a*, a second segment 301*b*, and a middle segment 301*c* between the first and second segments. The middle segment 301*c* has a cross section 301*d* (FIG. 3C) with a rounded square shape. As the stators and rotators are mounted onto the middle segment 301*c*, the rounded square-shaped cross section design advantageously allows additional generator modules to be easily added into the generator without the use of flanges.

All the first group of dielectric sectors of the generator modules are electrically connected using a copper pin terminal 327*a*. All the second group of dielectric sectors of the generator modules are electrically connected using a copper pin terminal 327*b*. The two terminals work as the output terminals of the generator and therefore may be considered as a first and second common terminal respectively. The power output can be easily and flexibly adjusted by adding or removing generator modules by changing the number of stators and/or rotators.

Further, both stators and rotators are aligned according to their dielectric sectors so that there is no phase difference between the outputs of different generator modules. The stators do not rotate in operation and therefore the alignment of their dielectric sectors can be realised when they are assembled. For the rotators, as they are driven by a single shaft, they can rotate in phase so that their dielectric sectors stay in alignment. The arrangement of the rotators and stators ensures the dielectric sectors of the same group have the same projection in the longitudinal direction of the shaft.

Figure 3E:
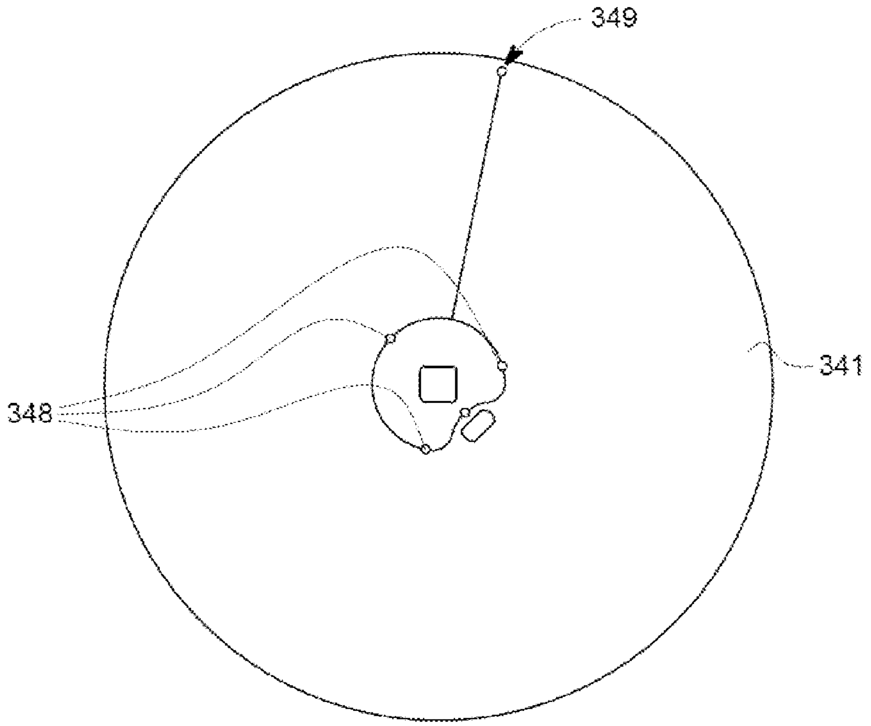
FIG. 3E illustrates an inner layer of the rotator substrate of the generator of FIG. 3A.

As illustrated, each stator substrate 321 is double-sided, and each rotator substrate 341 is double-sided. Take the first group of patterned coatings as an example. This group of patterned coatings at one side of the stator substrate 321 is electrically connected to the first group of patterned coatings at the other side of the stator substrate 321. To do so, as one example, two PCB vias may be respectively placed where the first terminal 327*a* and the second terminal 327*b* will pass through. The blind vias 328*a* and 328*b* are used to electrically connect the patterned coatings (such as copper coating sectors on which the dielectric sectors are disposed) on one side of the stator substrate to its nearest inner patterned coating layer. The blind vias 348 are used to electrically connect the patterned coatings (such as copper coating sectors on which the dielectric sectors are disposed) on one side of the rotator substrate to its nearest inner patterned coating layer. As a result, the coating sectors on each side of a stator are electrically connected to its nearest inner layer through blind vias (illustratively in the present embodiment, each sector uses 1 blind via, and each group of the sectors uses 3 blind vias), and the coating sectors of the same group join together on the inner layers and then connect to a terminal where a via placed in the center electrically connect the two sides of the stator. The rotator is arranged similarly in this aspect. Note that via 349 (FIG. 3E) is used as a common electrical terminal for the rotator, but it is only used in a pretreatment process. The vias as shown in the figures are for illustrative purposes. In practice, more vias or less vias may be used, and the vias used may be arranged in different manner.

By way of example, the housing 310 comprise a first cover 312, a second cover 314, and a shell 316 that form an internal space for housing the plurality of generator modules. The first cover 312, the second cover 314, and the shell 316 may be assembled using screws and nuts.

By way of example, each stator may be made using four-layer PCB boards, and each rotator may be made using four-layer PCB boards. In some embodiments, the first cover, the second cover, the shell, all the stator substrates and the rotator substrates are made of plastics, thereby rendering the generators according to one or more embodiments herein cost-effective, lightweight, and adaptable to a wider range of applications, such as in corrosive environments (e.g., in ocean) where conventional generators can be easily eroded or damaged.

Figure 4:
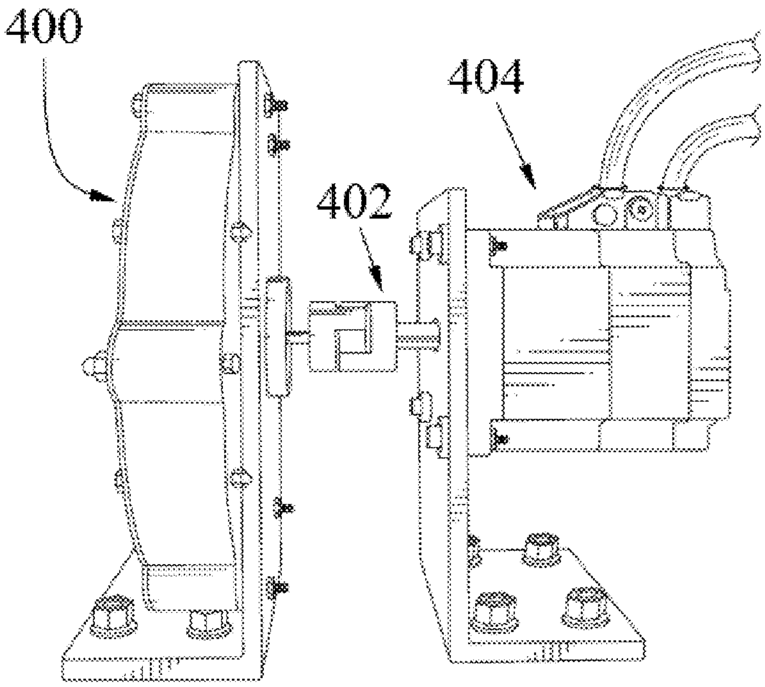
FIG. 4 illustrates a generator and its testing setup according to certain embodiments of the present disclosure.

FIG. 4 illustrates a generator and its testing setup according to certain embodiments of the present disclosure. As illustrated, a coupler 402 couples the output shaft of a motor 404 to a generator 400. The generator 400 can be the generator as described above according to one or more embodiments. The motor 404 drives one or more rotators of the generator 400 to rotate for generating electricity. By measuring the output, the performance of the generator 400 can be characterized.

Figure 5A:
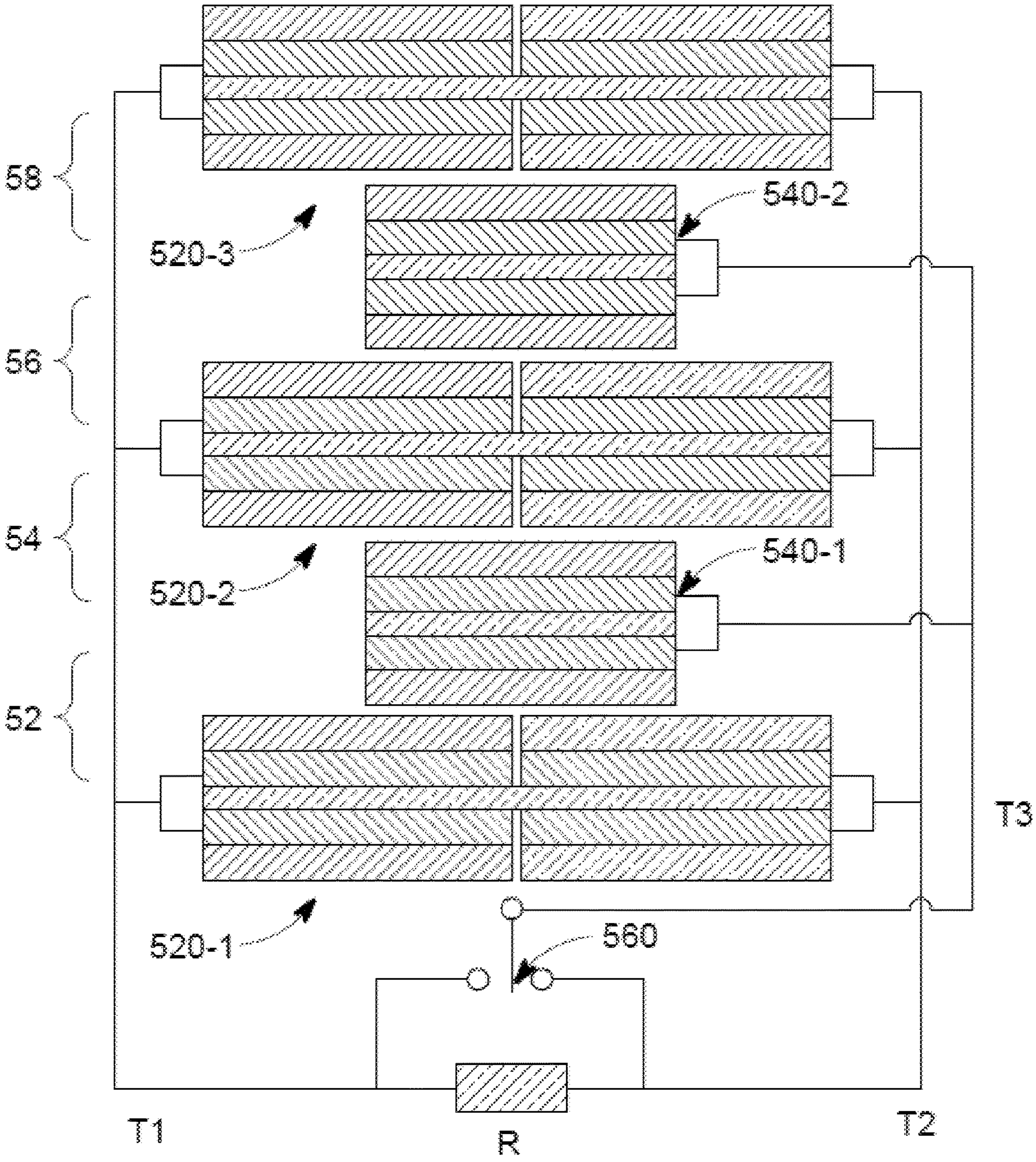
FIG. 5A illustrates a schematic electric circuit for a generator according to certain embodiments of the present disclosure.

For illustrative purpose and without loss of generality, FIG. 5A illustrates a simplified circuit for a generator comprising four generator modules 52, 54, 56 and 58. There are three stators 520-1, 520-2 and 520-3, and two rotators 540-1 and 540-2. Each of the stators and rotators are double-sided.

In operation, the first group of dielectric sectors for the three stators are always aligned regardless of the rotation angle of the rotators, and the first group of patterned coatings are electrically connected to a first common terminal T1. The second group of dielectric sectors for the three stators are always aligned regardless of the rotation angle of the rotators, and the second group of patterned coatings are electrically connected to a second common terminal T2. The terminals T1 and T2 function as output terminals for powering a load R. The third group of patterned coatings of the two rotators are electrically connected to a third common terminal T3. A mechanical switch 560 selectively connects the terminal T3 to one of the terminals T1 and T2.

In this way, the generator modules are serially mounted on a single shaft from the mechanical perspective and parallelly connected to the output terminals of the generator from the electrical perspective. The brush on each rotator and the teeth on the corresponding stator together form a two-way switch which can join the switch terminal to T1 and T2 alternatingly during continuous unidirectional rotation.

Figure 5B:
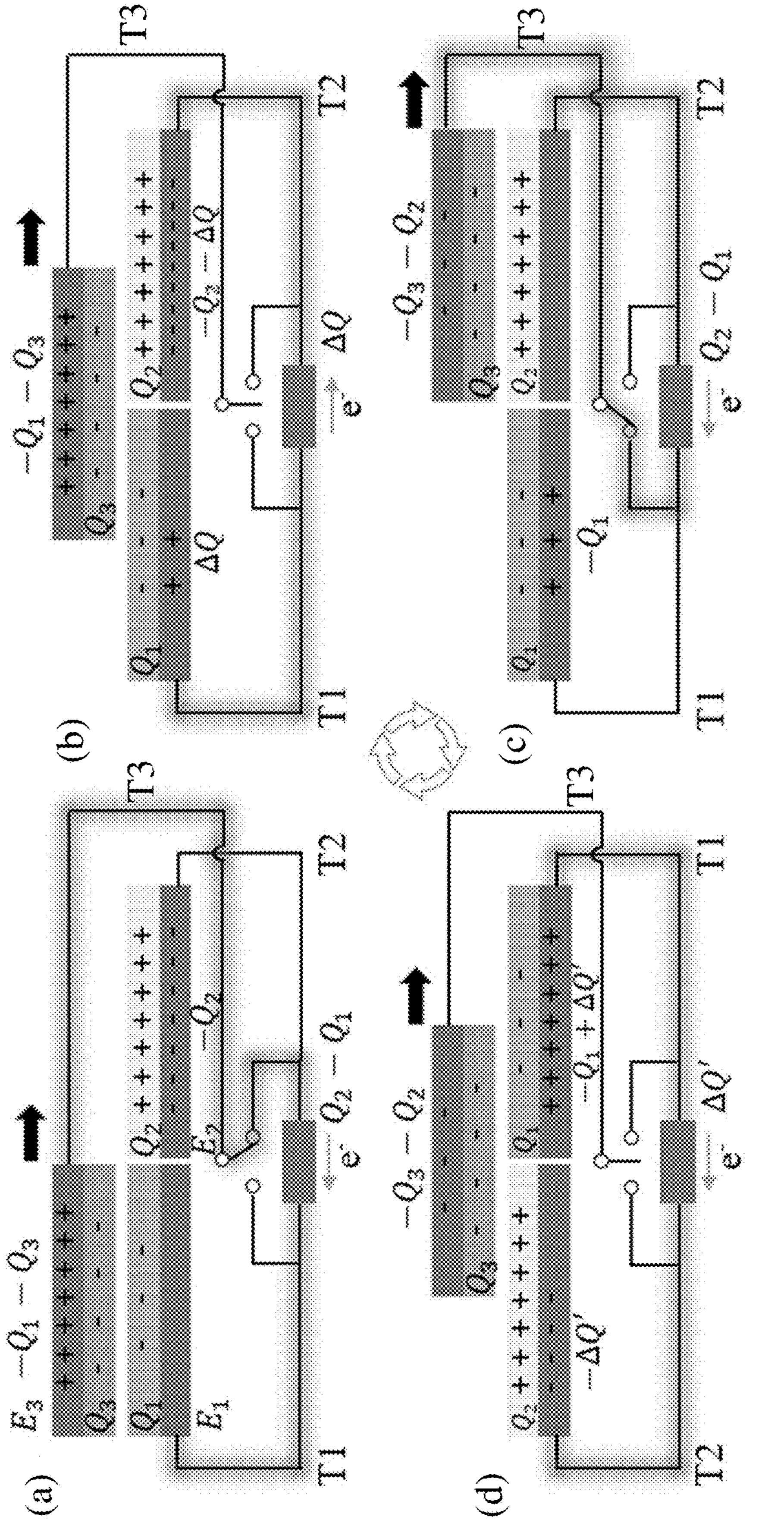
FIG. 5B illustrates a schematic charge transfer process for a generator module in the generator of FIG. 5A.

FIG. 5B depicts the charge transfer process of the generator of FIG. 5A. For conciseness, only one generator module is used to illustrate this charge transfer process. The charge transfer process is a cyclic process following the orders of (a)->(b)->(c)->(d)->(a) . . . . When the third group of dielectric sectors completely overlap the first group of dielectric sectors (see stage (a)), the switch terminal is connected to T2, and the amount of charge on electrode $E_3$ (Note that electrode $E_3$ refers to the third group of patterned coatings) changes to $-Q_1-Q_3$ from $-Q_3-Q_2$ (which is stage (d)). This is because the surface charge on the first and third groups of dielectric sectors are closer to that on $E_3$ (in the present embodiment, the thickness of the first or second group of dielectric sectors is much larger than that of the third group of dielectric sectors), which induces a charge (or an electron) transfer of a quantity of $Q_2-Q_1$ from T2 (or the switch terminal) to T1, as shown in stage (a).

As soon as the rotator departs from the aligned position with respective to the stator, the switch is turned off. When the third group of dielectric sectors have overlap with both the first and second groups of dielectric sectors, such as what is shown in stage (b), $E_1$ (which refers to the first group of patterned coating) loses electrons of an amount of $\Delta Q$ while $E_2$ (which refers to the second group of patterned coating) gains electrons of the same amount. That is, the electrons of the quantity of $\Delta Q$ are transferred from T1 to T2 inducing a reverse current flow. Once the third group of dielectric sectors align with the second group of dielectric sectors, as shown in stage (c), the switch terminal is in connection with T1. Similar to stage (a), the electrons of the quantity of $Q_2-Q_1$ are transferred from T1 to T2, resulting in charges of $-Q_3-Q_2$ on $E_3$, charges of $-Q_1$ on $E_1$, and zero charge on $E_2$.

With a continuous unidirectional rotation, the third group of dielectric sectors then has overlap with both the first and second groups of dielectric sectors again, as shown in stage (d). The charge transfer occurring between $E_1$ and $E_2$ is similar to that of stage (b). Till this stage, a full cycle is completed. As the rotation continues, it then enters stage (a) again and the cycle begins anew.

FIGS. 6A, 6B, 6C and 6D show characteristics of prototyped generators by measuring different electrical outputs according to one or more embodiments. The measurement is conducted using a setup similar to that as shown in FIG. 4.

Figure 6A:
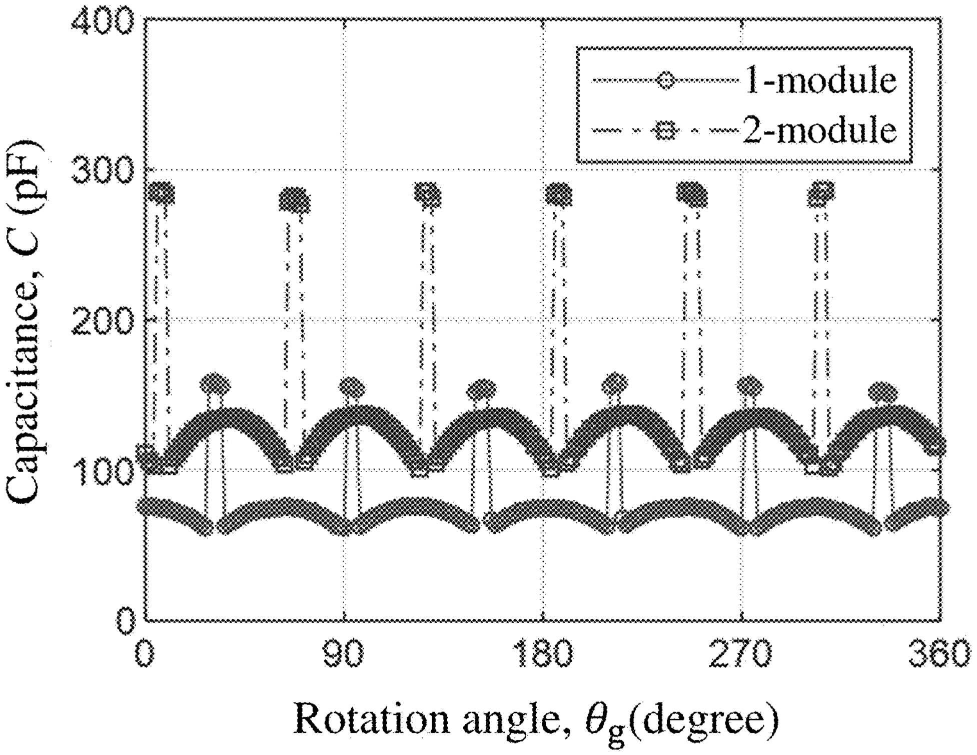
FIG. 6A shows generator's capacitance at difference rotation angles for two generators, one having one generator module and the other having two generator modules, according to certain embodiments of the present disclosure.

FIG. 6A shows the measured capacitance of two generators in a single turn at a step of 1.8 degrees. The numbers of the generator modules as included are one and two respectively. The two generators are labelled as "1-module" and "2-module" respectively. As clearly shown, there are 6 spikes in each turn because the switch is turned on 6 times per revolution. Further, the larger the number of generator modules, the larger the spikes will be. Besides, the peak capacitance approximately doubles for the 2-module generator compared to that of the 1-module generator, which indicates a good superposition mechanism for the two modules in the two-module generator.

Figure 6B:
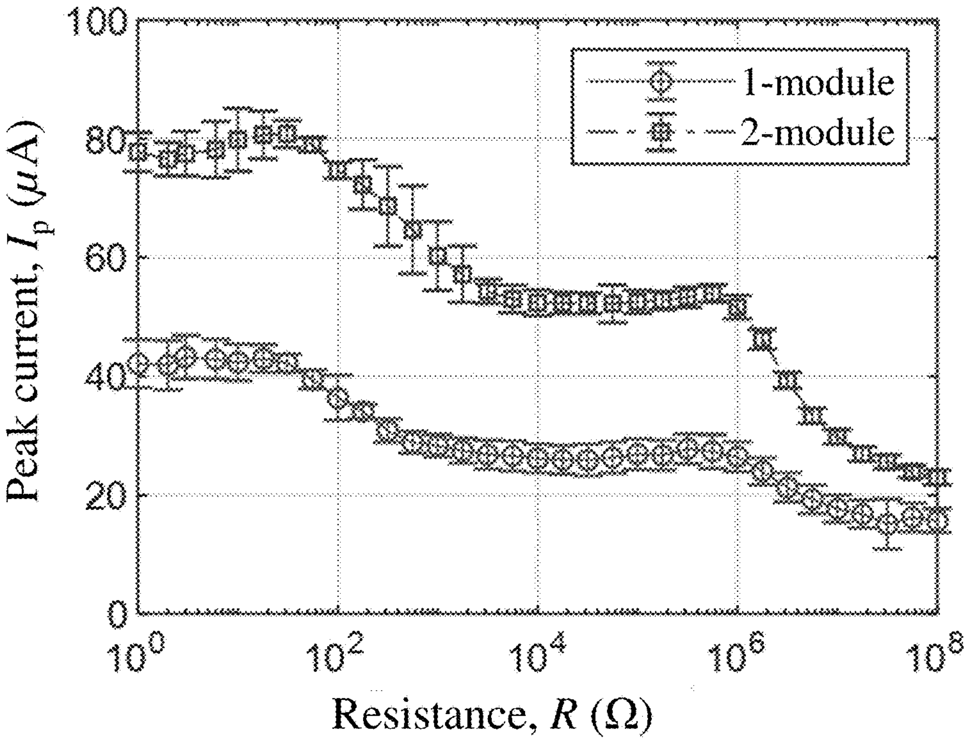
FIG. 6B shows generator's peak current output at different load resistances for two generators, one having one generator module and the other having two generator modules, according to certain embodiments of the present disclosure, where the rotation speed equals T rad/s.

FIG. 6B shows the measured peak current at various load resistances, which also confirms the proposed superposition mechanism, i.e., the superposed outputs for the mechanically-serial and electrically-parallel assembly of generator modules. Besides, as the increase in the load resistance R from $10^0$ to $10^8$ ohm, the peak current drops gradually and maintains the same order of magnitude, i.e. tens of μA, indicating that the generator can be regarded as a current source.

Figure 6C:
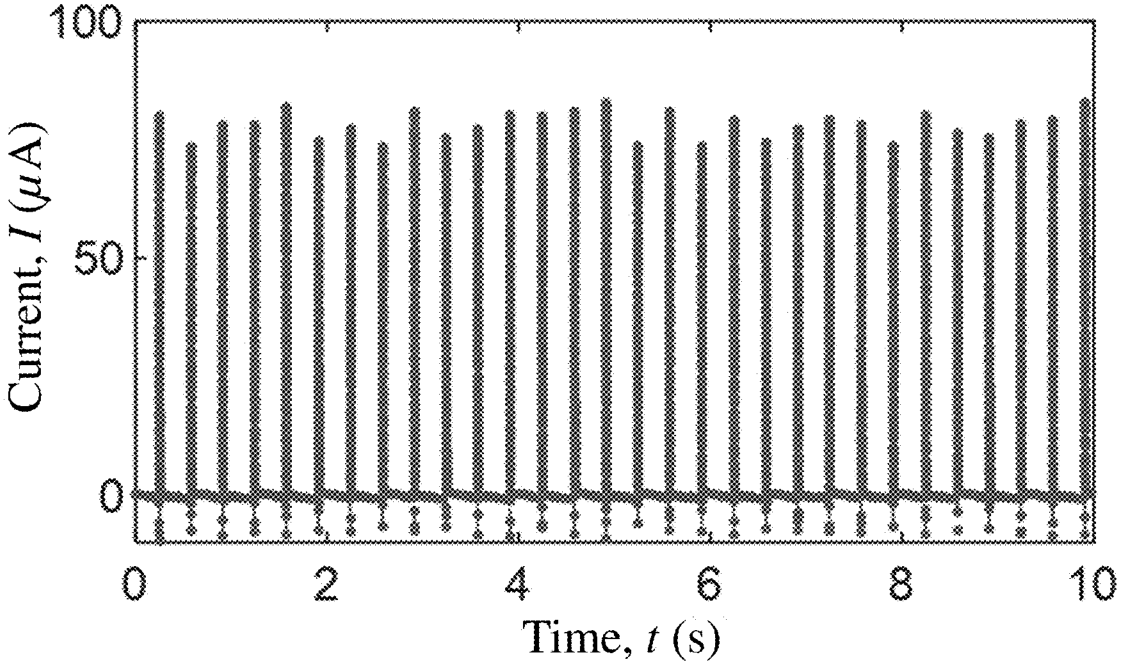
FIG. 6C shows the time history of a generator's current output in the form of pulse trains when the rotation speed equals w rad/s, the load resistance being 1 ohm and the number of generator modules being 2, according to certain embodiments of the present disclosure.
Figure 6D:
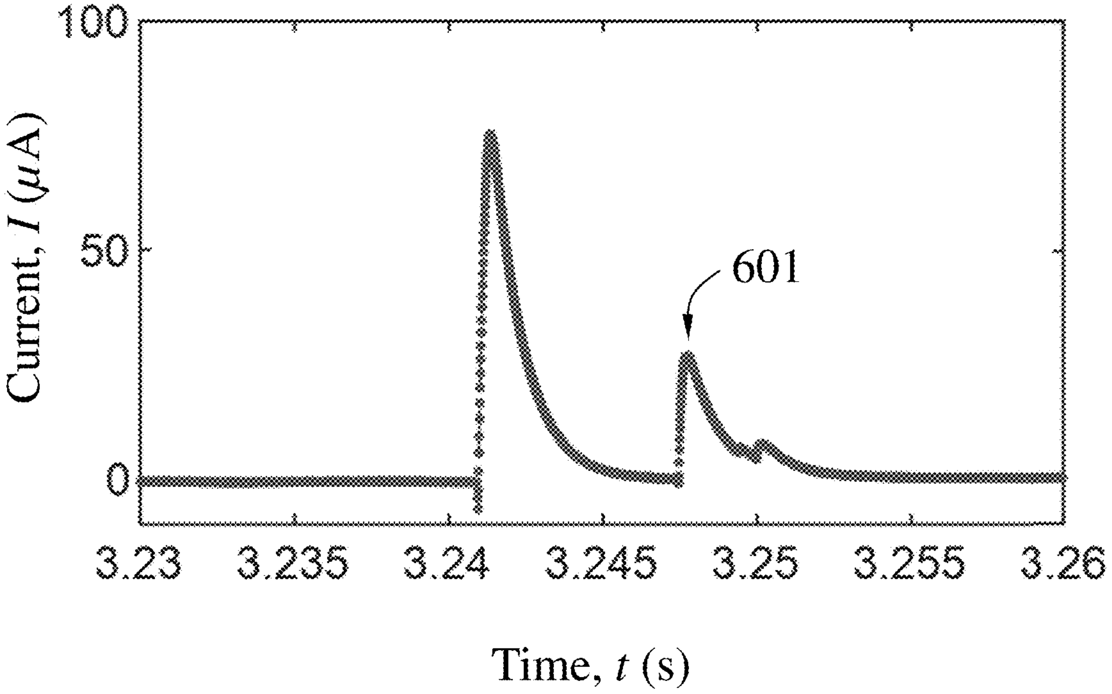
FIG. 6D shows an enlarged view of one pulse of FIG. 6C.

Indeed, the generator outputs current pulse trains, such as the example given in FIGS. 6C and 6D. FIG. 6C shows the time history of a generator's current output in the form of pulse trains when the rotation speed equals π rad/s, the load resistance being 1 ohm and the number of generator modules being 2. As can be seen, whenever the switch is turned on, a pulse is generated. Thus, there are 6 pulses per revolution based on the designed pattern of the electret. The frequency of the pulse is mainly dependent on the rotation speed when the number of dielectric sectors is constant. If the rotation speed of the generator increases, the pulse train will become denser, and accordingly the output current will become larger. FIG. 6D is an enlarged view of a single pulse in FIG. 6C. The minor peak 601 is believed to be caused by the consecutive contact between the brush and the tooth considering that each tooth actually has certain width and is not ideally a line.

Figure 7A:
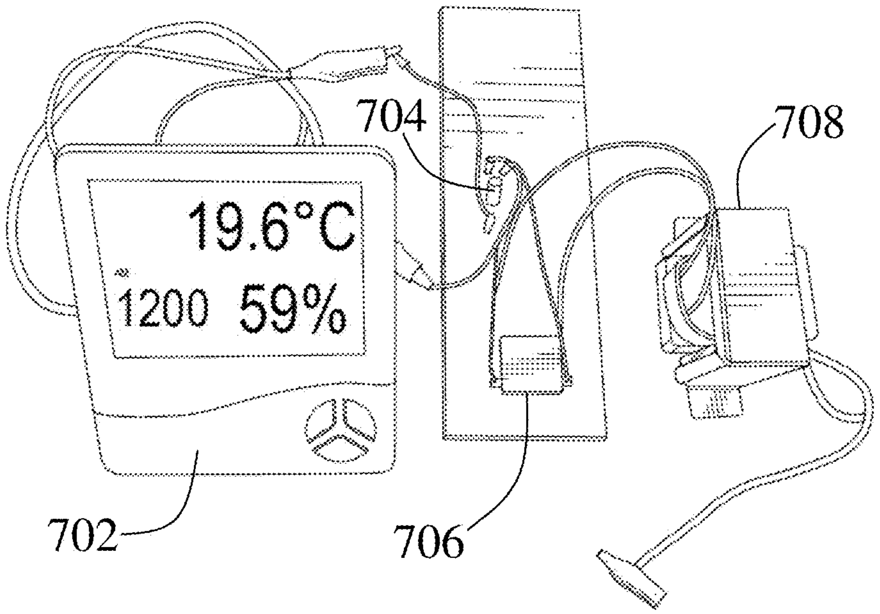
FIG. 7A illustrates a demonstration of powering a thermometer using a generator according to certain embodiments of the present disclosure.
Figure 7B:
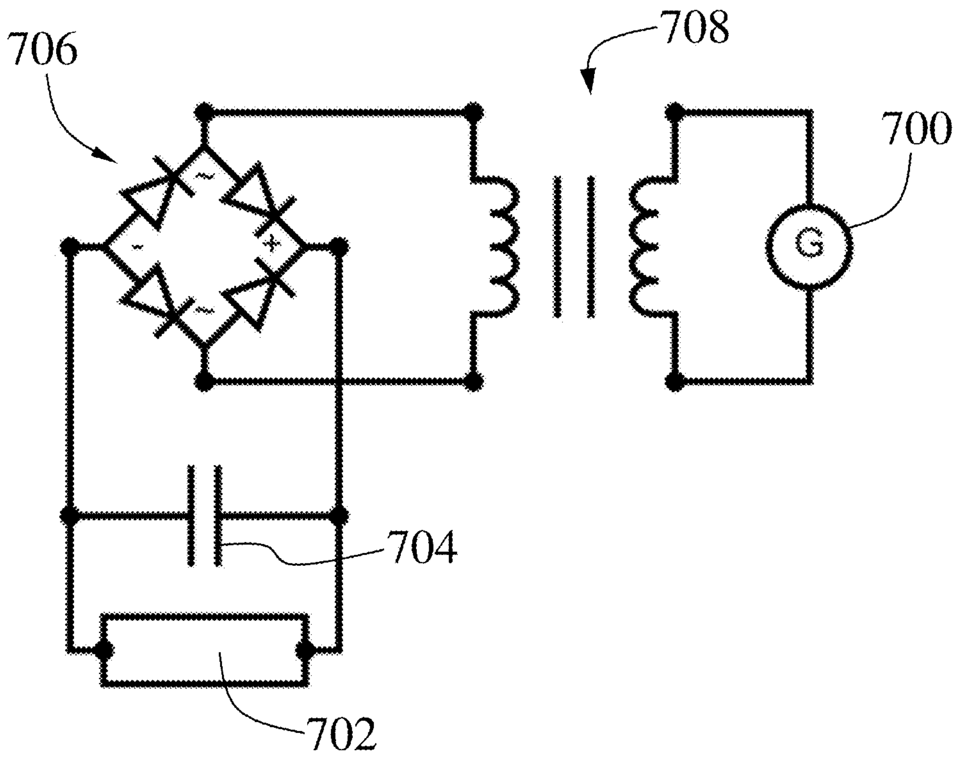
FIG. 7B shows the equivalent circuit used for the demonstration of FIG. 7A.

FIG. 7A shows a demonstration of powering a thermometer using a generator 700 and FIG. 7B shows an equivalent circuit for FIG. 7A. The generator 700 can be the generator as described above according to one or more embodiments. The demonstration shows a thermometer 702, a capacitor 704, a rectifier 706 and a transformer 708. This demonstration is only one example of how the generator according to one or more embodiments is applied. It will be understood that the generator as described herein can be used in a wide range of applications.

It will further be appreciated that any of the features in the above embodiments of the disclosure may be combined together and are not necessarily applied in isolation from each other. Similar combinations of two or more features from the above described embodiments or preferred forms of the disclosure can be readily made by one skilled in the art.

Unless otherwise defined, the technical and scientific terms used herein have the plain meanings as commonly understood by those skill in the art to which the example embodiments pertain. Embodiments are illustrated in non-limiting examples. Based on the above disclosed embodiments, various modifications that can be conceived of by those skilled in the art would fall within spirits of the example embodiments.

What is claimed is:

1. A generator module comprising:

a stator;

a rotator rotatable with respect to the stator; and a mechanical switch, wherein the stator comprises:

- a stator substrate having a first stator side;
- a first group of patterned coatings that is electrically conductive and disposed on the first stator side;
- a second group of patterned coatings that is electrically conductive and disposed on the first stator side, the first group of patterned coatings being electrically isolated from the second group of patterned coatings;
- a first group of dielectric sectors that is negatively charged and disposed on the first group of patterned coatings; and a second group of dielectric sectors that is positively charged and disposed on the second group of patterned coatings, each positively charged dielectric sector being adjacent to two negatively charged dielectric sectors along a circumferential direction, each negatively charged dielectric sector being adjacent to two positively charged dielectric sectors along the circumferential direction, wherein the rotator comprises:

a rotator substrate having a first rotator side;

a third group of patterned coatings that is electrically conductive and disposed on the first rotator side; and a third group of dielectric sectors that is negatively or positively charged and disposed on the third group of patterned coatings, wherein the first stator side of the stator substrate faces the first rotator side of the rotator substrate, wherein the first group of patterned coatings electrically connect to a first electrical terminal, the second group of patterned coatings electrically connect to a second electrical terminal, and the third group of patterned coatings electrically connect to a third electrical terminal, wherein the mechanical switch is configured to allow the third electrical terminal to be selectively connectable to one of the first electrical terminal and the second electrical terminal.

2. The generator module of claim 1, wherein each patterned coating sector of the first and second groups of patterned coatings is provided with a tooth, thereby forming a plurality of teeth, wherein the mechanical switch comprises a conductive brush and the plurality of teeth, the conductive brush being attached to the rotator.

3. The generator module of claim 2, wherein the conductive brush comprises:

a first end mounted onto the first rotator side of the rotator substrate and electrically connected to the third electrical terminal; and a second end having a brush head electrically contactable to one of the plurality of teeth for selectively connecting to one of the first electrical terminal and the second electrical terminal.

4. The generator module of claim 1, further comprising a thrust bearing structure arranged on one of the first stator side of the stator substrate and the first rotator side of the rotator substrate.

5. The generator module of claim 4, wherein the thrust bearing structure comprises:

a plurality of concave holes formed on one of the first stator side and the first rotator side; and a plurality of bearing balls with each bearing ball being received in a respective concave hole.

6. The generator module of claim 1, wherein the first group of dielectric sectors and the second group of dielectric sectors have a same thickness.

7. The generator module of claim 6, wherein the first group of dielectric sectors and the second group of dielectric sectors have a greater thickness than the third group of dielectric sectors.

8. The generator module of claim 1, wherein both the stator substrate and the rotator substrate are made of plastics.

9. The generator module of claim 1, wherein the first group of patterned coatings, the second group of patterned coatings, and the third group of patterned coatings are patterned metallic coatings or comprise one or more conductive polymer materials.

10. The generator module of claim 1, wherein each of the first group of dielectric sectors, the second group of dielectric sectors, and the third group of dielectric sectors comprises one of an electret film and a triboelectric film.

11. A generator for generating electricity, comprising:

a housing; and a plurality of generator modules disposed within the housing and sharing a shaft, thereby forming a chain of generator modules along a longitudinal axis of the shaft, wherein each generator module comprises a stator and a rotator that are mounted onto the shaft, wherein the stator comprises:

a stator substrate having a first stator side;

a first group of patterned coatings that is electrically conductive and disposed on the first stator side;

a second group of patterned coatings that is electrically conductive and disposed on the first stator side, the first group of patterned coatings being electrically isolated from the second group of patterned coatings;

a first group of dielectric sectors that is negatively charged and disposed on the first group of patterned coatings; and a second group of dielectric sectors that is positively charged and disposed on the second group of patterned coatings, each positively charged dielectric sector being adjacent to two negatively charged dielectric sectors along a circumferential direction, each negatively charged dielectric sector being adjacent to two positively charged dielectric sectors along the circumferential direction, wherein the rotator comprises:

a rotator substrate having a first rotator side;

a third group of patterned coatings that is electrically conductive and disposed on the first rotator side; and a third group of dielectric sectors that is negatively or positively charged and disposed on the third group of patterned coatings, wherein the first stator side of the stator substrate faces the first rotator side of the rotator substrate, wherein the first group of patterned coatings electrically connect to a first electrical terminal, the second group of patterned coatings electrically connect to a second electrical terminal, and the third group of patterned coatings electrically connect to a third electrical terminal, the generator further comprises a first common terminal, a second common terminal and a third common terminal, wherein the first electrical terminal of each generator module is connected to the first common terminal, the second electrical terminal of each generator module is connected to the second common terminal and the third electrical terminal of each generator module is connected to the third common terminal, such that the plurality of generator modules are electrically connected in parallel, wherein each generator module comprises a mechanical switch that allows the third electrical terminal to selectively connect to one of the first electrical terminal and the second electrical terminal.

12. The generator of claim 11, wherein the shaft comprises a first segment, a second segment, and a middle segment between the first segment and the second segment, and wherein the middle segment has a cross section of a rounded square shape.

13. The generator of claim 11, wherein each patterned coating sector of the first and second groups of patterned coatings is provided with a tooth, thereby forming a plurality of teeth, and wherein the mechanical switch comprises a conductive brush and the plurality of teeth, the conductive brush being flexible and attached to the rotator.

14. The generator of claim 11, wherein the plurality of generator modules are aligned in terms of their dielectric sectors of stators and rotators such that outputs of the plurality of generator modules are in phase.

15. The generator of claim 11, wherein the dielectric sectors of the plurality of generator modules comprise one of polytetrafluoroethylene (PTFE) films or triboelectric materials.

16. The generator of claim 11, wherein the housing comprises a first cover, a second cover, and a shell that form an internal space for housing the plurality of generator modules, wherein the first cover, the second cover, the shell, the stator substrate and the rotator substrate of each generator module are made of plastics.

17. The generator of claim 11, wherein two generator modules of the generator that are adjacent to each other share one stator substrate or one rotator substrate.

18. The generator of claim 11, wherein each generator module comprises a thrust bearing structure arranged on one of the first stator side of the stator substrate and the first rotator side of the rotator substrate, wherein the thrust bearing structure comprises: a plurality of concave holes formed on one of the first stator side and the first rotator side; and a plurality of bearing balls with each bearing ball being received in a respective concave hole.

19. The generator of claim 11, wherein each stator substrate is symmetrically provided with double-sided coatings and formed with vias such that the coatings at both sides are electrically connected, wherein each rotator substrate is symmetrically provided with double-sided coatings and formed with vias such that the coatings at both sides are electrically connected.

* * * * *